United States Patent

Murph

[11] Patent Number: 5,996,934
[45] Date of Patent: Dec. 7, 1999

[54] TETHERED AUTOGYRO

[76] Inventor: Ellis G. Murph, 2894 S. Bird Dr., SW., Shallotte, N.C. 28459

[21] Appl. No.: 08/976,745

[22] Filed: Nov. 24, 1997

[51] Int. Cl.[6] .............................. B64C 27/52; B64C 27/00
[52] U.S. Cl. ...................................... 244/17.25; 244/17.11
[58] Field of Search ............................ 244/17.25, 153 A, 244/17.11; 416/135, 134 A, 148; 446/36

[56] References Cited

U.S. PATENT DOCUMENTS

| | | |
|---|---|---|
| 2,181,477 | 11/1939 | Chupp . |
| 2,222,402 | 11/1940 | Carrasco ............................. 244/153 A |
| 2,442,846 | 8/1948 | Dunn .................................. 244/153 A |
| 2,861,641 | 11/1958 | Bensen ................................ 244/153 A |
| 3,194,521 | 7/1965 | Rider et al. . |
| 3,558,082 | 1/1971 | Bennie ................................. 244/17.25 |
| 3,771,923 | 11/1973 | DeMontaigu et al. .................. 416/143 |
| 3,857,194 | 12/1974 | Guttman . |
| 4,154,017 | 5/1979 | Bilardi et al. . |
| 5,149,020 | 9/1992 | Rundle et al. . |
| 5,304,090 | 4/1994 | Vanni ....................................... 446/36 |
| 5,381,988 | 1/1995 | Kattas . |
| 5,544,844 | 8/1996 | Groen et al. . |

Primary Examiner—Peter M. Poon
Assistant Examiner—Charles R. Ducker, Jr.
Attorney, Agent, or Firm—Rhodes & Mason, PLLC

[57] ABSTRACT

A tethered autogyro including means for tilting the autogyro rotor to compensate for differences in relative air pressure on rotor blades while minimizing frictional pressures restricting rotor rotation. The autogyro includes a fuselage; a rotor mast having a lower end attached to the fuselage and a rearwardly tilted upper section; upper and lower retainers separated by a given distance on the mast upper section; and a tiltable rotor mounted on the mast between the retainers, the rotor including a hub having a vertical dimension greater than the given distance, and rotor blades attached to the hub. The hub includes a mast receiving bore that increases in diameter from an upper circular edge having a diameter approximately equal to the diameter of the mast to a lower opening that has a diameter in at least one direction larger than the diameter of the mast.

13 Claims, 3 Drawing Sheets

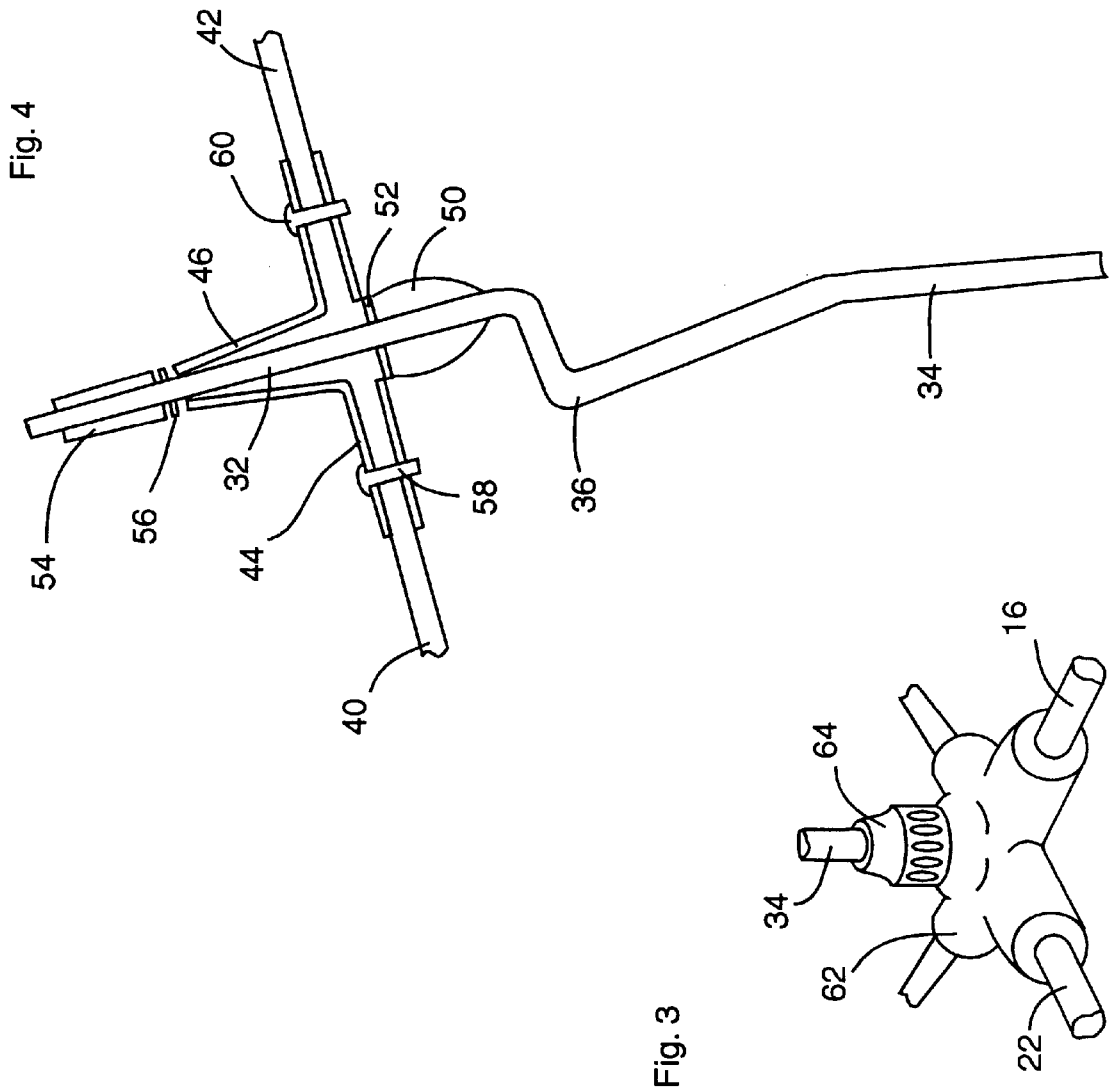

TETHERED AUTOGYRO

BACKGROUND OF THE INVENTION

1. Field of the Invention

The present invention relates generally to a model or toy autogyro that is flown from a tether and powered solely by autorotation of the autogyro rotor in response to wind forces, and in particular to a model autogyro of this type in which the rotor is attached in a manner permitting teetering of the rotor in response of changing wind forces, thereby providing lateral stability.

2. Description of the Prior Art

Tethered model or toy autogyros, are flown much like kites, with the autogyro being connected to the flyer by a string or tether. As used herein, the term "tethered autogyro" is intended to describe an autogyro flown on a line or tether, and not as a limitation requiring the tether to be attached. Like kites, autogyros are lifted into the air by the force of wind against a surface. In the case of autogyros, the wind acts against the lower surface of rotor blades, causing the blades to turn, creating lift on the autogyro.

Basically, autygyros are comprised of a fuselage, a rotor mast or shaft that extends upwardly from the shaft and a rotor that turns at the top of the mast. The tether is normally attached to the front of the fuselage at a point which causes the rotor to tilt rearwardly when the autogyro is airborne so that the wind will impact the underside of the rotor blades.

An autogyro rotor turns in response to the force of the wind against the underside of the rotor blades. On one side of the rotor, the blade approaches the wind, while the blade on the opposite of the rotor moves away from the wind. Lift on the blade moving toward the wind is greater than on the blade moving away from the wind due to the difference in the configuration of the blade leading and trailing edges, and to the greater relative velocity of the wind on the approaching blade. This greater lift tends to lift the approaching side of the autogyro more that the other side, causing the autogyro to turn or roll, instead of maintaining level steady flight.

Various proposals have been made in the prior art to address this problem. For example, U.S. Pat. No. 5,381,988 to Kattas describes an autogyro, or autoglider, in which the rotor is connected by a horizontal hinge to the top of a shaft that rotates in a bushing at the top of a vertical mast. In an autogyro described in U.S. Pat. No. 3,194,521 to Rider et al., the inner end of each rotor blade is hinged to a rotor hub that is mounted on a rotatable shaft. Each blade, as it is on the approach side of its rotation, is raised to compensate for the greater lift.

Model autogyros, to be flown successfully, must be light in weight. Since they often crash, they must also be durable. Since their lift depends upon the free rotation of the blades under, often gentle, wind forces, any friction that must be overcome limits the flying ability of the autogyro. Unfortunately, the above designs, due to their complexity significantly increase the autogyro's weight, and are easily broken. Moreover, the attachment of the rotor to a shaft that must be rotated in a bushing or housing produces frictional forces that restrict the turning freedom of the rotor.

An autogyro design addressing the problem of stability without adversely affecting the flying characteristics of the autogyro, or its durability, would be of considerable value and utility.

SUMMARY OF THE INVENTION

The tethered autogyro of the present invention is basically comprised of a fuselage, a rotor mast extending upward from the fuselage, and a rotor at the upper end of the rotor mast. Of particular importance is the means for connecting the rotor to the mast to provide stability to the autogyro.

The exact configuration of the fuselage is not of critical importance to the invention. Generally, the fuselage will include a longitudinal frame member, a connector near the front of the fuselage for attaching a tether, and landing gear. Normally, vertical and/horizontal stabilizers will be attached near the rear of the fuselage. Other components of a decorative nature, such as a cowling, pilot seat or nonfunctional prop, may be also be included.

The rotor mast is designed so that at least an upper section of the mast will be tilted toward the rear of the autogyro when the autogyro is flown. With this attitude, the wind forces will impact the lower surfaces of the rotor blades, providing lift. Preferably, the rotor mast is formed of a rearwardly tilted upper section with a circular cross section, a generally vertical lower section, and a central section connecting the upper end of the lower section to the lower end of the upper section. Normally, the three sections will be integral with each other, and can be formed by bending a single rod or mast to the desired shape.

The rotor of the invention is comprised of a central hub supported for free rotation at a connection point intermediate the upper and lower ends of the mast upper section. Rotor blades extend outwardly from the central hub. Preferably, two opposed rotor blades are used. However, upon reading of the present description, one skilled in the art will be able to design similar structures using more that two rotor blades.

The design of the rotor hub, and the means for positioning the hub on the rotor mast are significant aspects of the present invention. The hub includes a central mast receiving bore that tapers from an upper circular edge having a diameter approximately equal to the mast diameter to a lower edge, not necessarily circular, of a greater diameter in at least one cross-sectional dimension.

In one configuration, the rotor hub includes a rotor blade mounting plate, and a central mast sleeve that extends upward from the upper surface of the mounting plate. A mast receiving bore extends downwardly from an upper circular edge at the top of the sleeve to a bottom opening. The bottom opening may be circular or of an elongated shape, such as a rectangle. At least the dimension of the bottom opening parallel to the axes of the rotor blades will be greater than the diameter of the mast.

The hub is held in position on the upper section of the mast by a pair of spaced retainers positioned at a distance slightly greater than the vertical dimension, i.e., the distance from the top to the bottom, of the hub. For simplicity sake, the retainers are preferably in the shape of sleeves having an inner diameter equal to the outer diameter of the upper mast section. These sleeves are slidably positioned on the mast and are held in place by frictional engagement. Thus, one or both of the retainers can be moved up or down the mast to a desired position.

In order to reduce friction between the retainers and the adjacent ends of the hub, washers or bushings may be positioned around the mast between the hub and one or both of the retainers. These washers or bushing may be of a low friction material, such as nylon.

The inner ends of the rotor blades may be attached to opposite sides of the hub mounting plate with screws or other fasteners. The plate may be a single plate or a rectangular channel with parallel upper and lower plates spaced at a distance equal to the thickness of the inner ends of the rotor blades, so that the blade inner ends can be inserted between the plates, and then secured in place with fasteners extending through the plates and the blade.

Each rotor blade has a generally planar lower surface, an upwardly curved upper surface, a forward edge and a trailing edge. The radius of curvature of the forward edge is greater than that of the trailing edge and the apexes of the upper surfaces are closer to the forward edge than to the trailing edge. The blades are preferably offset so that the apexes are longitudinally aligned. The blades are preferably formed of balsa wood, but may be of another lightweight material such as Styrofoam or other plastic, or paper.

It has been found that the autogyro has the greatest stability if the hub center, i.e., the balance point, of the rotor hub is positioned approximately over the center of the fuselage. Thus, the rotor mast is preferably formed of a generally vertical lower section having a lower end attached to the center of the fuselage, a rear tilted upper section having a lower end in front of the longitudinal axis of the lower section, and a rearwardly curved central section joining the upper end of the lower section to the lower end of the upper section. The rotor hub is positioned at a point on the upper section that is intersected by the longitudinal axis of the lower section. The mast sections preferably all lie in a common plane.

The lower end of the mast is attached to the fuselage with a mount that includes a vertical opening into which the end of the mast is inserted. While the mast may be held in place by frictional engagement, the mount may also include a locking member that can be tightened to hold the mast securely in place. The mount may also include other openings for attachment of parts of the fuselage.

The autogyro is flown by attaching a tether to one of the connection points at the front of the fuselage, and holding the autogyro so that the wind force impinges on the underside of the rotor blades, causing the rotor to turn. Rotation of the rotor, and the blade configuration cause the autogyro to lift. The tether is then paid out until the autogyro is at the desired distance from the operator.

The wind force or air pressure on the rotor causes the hub to move upwardly on the upper mast section away from the lower retainer until the upper end of the hub bore engages the upper retainer, or an intermediate washer, if present. As a result, the only contact with the mast is along the inner edge of the hub sleeve at its upper end.

As the rotor turns, the blade rotating toward the front of the fuselage is subjected to a relatively greater wind velocity than that of the blade on the opposite side of the hub, which is moving away from the wind. Thus, the approaching blade tends to lift to a greater extent than the other blade. In the absence of some compensating mechanism, this unbalance lifting would create instability, causing the autogyro to tilt or roll to one side.

However, in the present invention, tilting of the rotor to raise the approaching blade offsets the uneven lifting. This tilting is achieved by the rotor teetering or pivoting at the outer end of the sleeve. Since the sleeve bore expands in diameter and the mounting plate includes an enlarged opening, tilting is possible until the mast abuts the inner wall of the bore. As the rotor continues to turn, the blades reverse position and the rotor tilts in the opposite direction.

If the autogyro is flown directly away from the wind, the upper mast section will be tilted directly toward the rear of the fuselage. However, if it is desired to fly the autogyro at an angle to the wind, the mast can be rotated in the mast mount so that the upper section of the mast tilts at an angle to one side or the other of the fuselage in alignment with the wind direction. If a locking member is used to secure the mast, it will first need to be loosened.

Accordingly, one aspect of the present invention is to provide a tethered autogyro comprised of a fuselage having a mast mount; a rotor mast extending upward from the mast mount, the mast including a generally vertical lower section having a lower end attached to the fuselage and an upper end, a rearwardly tilted upper section having lower and upper ends, and a central section connecting the upper end of the lower section to the lower end of the upper section; upper and lower retainers positioned on the mast upper section; and a tiltable rotor mounted on the mast between the retainers, the rotor including a mast receiving bore tapering outwardly from an upper end to a lower end.

Another aspect of the present invention is to provide a tethered autogyro comprised of a fuselage; a rotor mast extending upward from the fuselage; upper and lower retainers positioned on the mast at a given distance from each other; and a tiltable rotor mounted on the mast between the retainers, the rotor including a hub having a vertical dimension less than the given distance, and rotor blades extending outwardly from the hub, the hub including a rotor blade mounting plate having upper and lower surfaces and a mast receiving opening extending through the plate between the surfaces, and a mast receiving sleeve extending upwardly from the opening and around the sleeve, the mast extending through the plate opening and the sleeve.

Still another aspect of the present invention is to provide a tethered autogyro comprised of a fuselage having a mast mount; a rotor mast extending upward from the fuselage mast mount, the mast including a generally vertical lower section having a lower end attached to the mast mount and an upper end, a rearwardly tilted upper section having lower and upper ends, and a central section connecting the upper end of the lower section to the lower end of the upper section; upper and lower retainers slidably positioned on the mast upper section, the retainers being separated by a given distance; and a tiltable rotor mounted on the mast between the retainers, the rotor including a hub having a vertical dimension, and rotor blades extending outwardly from the hub, the hub including a rotor blade mounting plate having upper and lower surfaces with a mast receiving opening extending through the plate between the surfaces, and a conical mast receiving sleeve extending upwardly from the around the opening, the sleeve having an upper diameter slightly greater than the diameter of the mast and a lower diameter greater than the upper diameter, the mast extending through the plate opening and the sleeve.

These and other aspects of the present invention will become apparent to those skilled in the art after a reading of the following description of the preferred embodiment, taken together with the drawings.

BRIEF DESCRIPTION OF THE DRAWINGS

FIG. 3 is an enlarged perspective view of the mast mount.

FIG. 4 is a detailed sectional side view of the upper part of the mast, the rotor hub, and inner ends of the rotor blades.

FIG. 5 is an enlarged perspective view of the bottom of the rotor hub.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
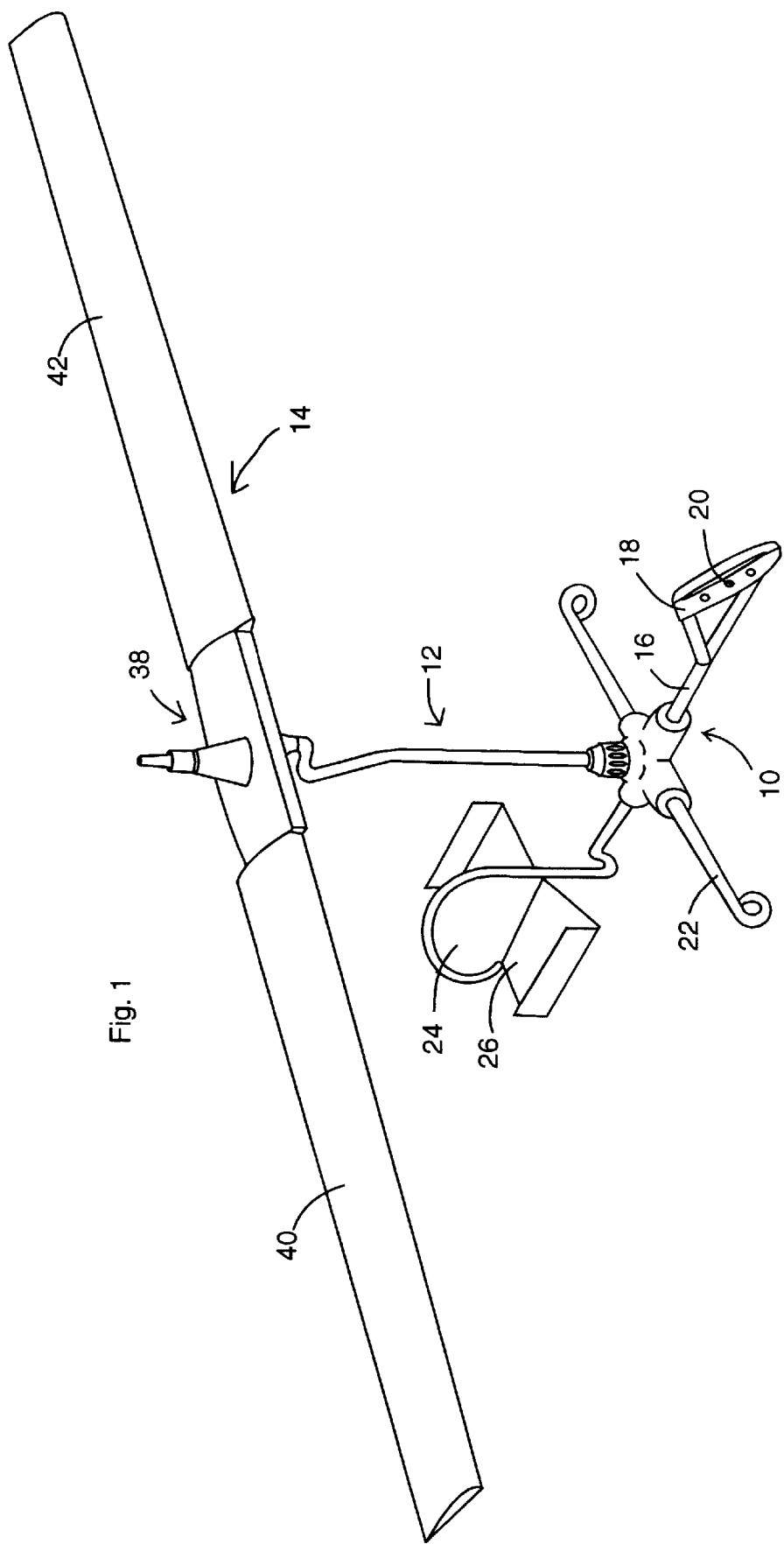
FIG. 1 is a perspective view of a preferred embodiment of the autogyro of the present invention.
Figure 2:
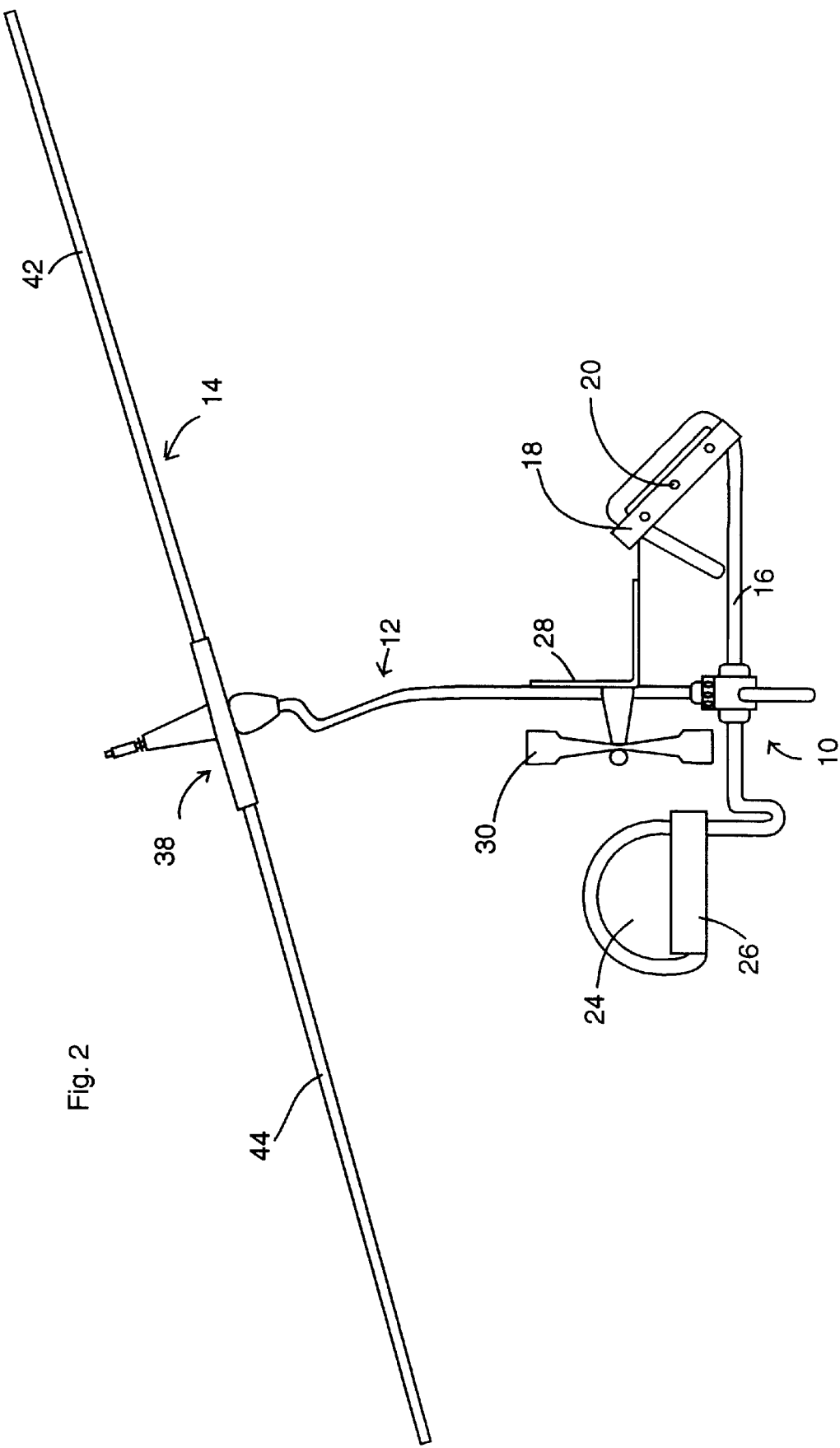
FIG. 2 is side view of the autogyro of FIG. 1, with decorative accessories added.

As best illustrated in FIGS. 1 and 2, the preferred embodiment of the invention is comprised of a fuselage, generally 10, a rotor mast, generally 12, having a lower end attached to fuselage 10, and a rotor, generally 14, mounted at the upper end of rotor mast 12.

Fuselage 10 is comprised of a longitudinal frame member 16, a connector 18 with openings 20 for attaching a tether, and landing gear 22. A vertical stabilizer 24 and a horizontal stabilizer 26 are attached at the rear of frame member 16. FIG. 2 also includes, for decorative purposes, a pilot seat 28 and a nonfunctional prop 30. These decorative components have been omitted from FIG. 1 for reasons of clarity.

Rotor mast 12 is comprised of a rearwardly tilted upper section 32, a generally vertical lower section 34, and a central, rearwardly extending section 36 connecting the upper end of the section 34 to the lower end of section 32. Sections 32, 34 and 36 are formed by bending an aluminum rod into the configuration shown.

Rotor 14 is comprised of a central hub, generally 38, and rotor blades 40 and 42. Hub 38 includes a slotted, rotor blade mounting plate 44, and a conical mast sleeve 46, extending vertically upward from plate 44 around an opening in the upper surface of plate 44. An elongated opening 48 is located in the lower surface of plate 44. The length of opening 48 and the diameter of the lower end of sleeve 46 are greater than the diameter of mast 12. The outer end of sleeve 46 has a diameter only slightly greater than the diameter of mast 12.

Rotor 14 is mounted at approximately the center of upper section 32 by inserting section 32 through opening 48 and sleeve 46. A lower retainer sleeve 50 and bushing 52 are mounted onto section 32 before mounting of rotor 14, and an upper retainer sleeve 54 and a washer 56 are mounted onto section 32 above rotor 14. Retainers 50 and 54 are held in place by friction.

The distance between bushing 52 and washer 56 is greater than the distance from the top to the bottom of hub 38. Therefore, hub 38 is free to move up and down on section 32 between retainers 50 and 54. Preferably, this distance is from about ⅛ to about ¼ inch, so that hub 38 can be moved out of contact with retainer 50 during flight of the autogyro. The inner ends of blades 40 and 42 are inserted into slotted mounting plate 44, and are held in place with fasteners 58 and 60, respectively.

The lower end of rotor mast 12 is attached to fuselage 10 with mount 62, shown in detail in FIG. 3. Locking member 64 is used to hold mast 12 securely in place. Frame member 16 and landing gear 22 are also inserted into openings in mount 62. The extent of insertion may be adjusted to balance the autogyro.

In order to fly the autogyro, a tether is attached to an opening 20 in connector 18, and the autogyro in held toward the wind and tilted so that the wind strikes the underside of blades 40 and 42. The air pressure pushes rotor 14 upward on mast section 32 against washer 56 and upper retainer 54, and away from the lower retainer 50, until the only contact between mast section 32 and rotor 12 is along the inner edge of the upper end of sleeve 46.

As either blade 40 or 42 rotates toward the front of fuselage 10, i.e., into the wind, the blade is lifted, causing rotor 14 to teeter or pivot at the top edge of mast sleeve 46. The lifting of the blade can continue until the inner surface of sleeve 46 against mast section 32 limits further movement. Continued rotation reverses the blade positions, causing the other blade to lift. As a result, unbalancing forces created by a difference in lift on one side of the fuselage versus the other is eliminated, producing a stable flight.

Thus, the present invention provides a means for compensating for uneven lift on the rotor blades that is simple and durable in its construction, while being highly effective in result. Moreover, with the present construction, there are virtually no frictional forces to restrict turning of the rotor. Thus, flying of the autogyro in very light winds is possible.

Certain modifications and improvements will occur to those skilled in the art upon a reading of the foregoing description. It should be understood that all such modifications and improvements have been deleted herein for the sake of conciseness and readability but are properly within the scope of the follow claims.

What is claimed is:

1. A tethered autogyro comprised of:
   a) a fuselage having a front and a rear;
   b) a tiltable rotor including a central bore of a given length tapering from a circular first edge with a given diameter to a second continuous edge, said rotor including a rotor blade mounting plate having first and second surfaces and a mast receiving sleeve extending from said first surface, said bore extending through said plate and said sleeve, said second surface being closer to said fuselage that said first surface, and said second continuous edge being closer to said fuselage that said first edge;
   c) a rotor mast having a circular cross-section less than said given diameter extending from said fuselage through said bore; and
   d) retainers positioned on either side of said rotor at a distance from each other greater than said given length.

2. The autogyro of claim 1, wherein said mast includes an upper mast section tilted toward the rear of said fuselage.

3. The autogyro of claim 1, wherein said fuselage includes a mast mount with a releasable locking member, said mast having an end inserted into said mount, and secured in place by said locking member.

4. The autogyro of claim 1, further including a friction reducing member between at least one of said retainers and said rotor.

5. The autogyro of claim 1, wherein said mast includes a first section having a first end attached to said fuselage and a second end, a second section having first and second ends, said second section being tilted toward the rear of said fuselage and a central section connecting the end of said lower section to the lower end of said upper section.

6. The autogyro of claim 1, further including at least one stabilizer at the rear of said fuselage.

7. The autogyro of claim 1, further including a tether connector at the front of said fuselage.

8. A tethered autogyro comprised of:
   a) a fuselage having a front, a rear and a mast mount;
   b) a rotor mast extending from said fuselage mast mount, said mast including a generally vertical first mast section having a first end attached to said fuselage and a second end, a second mast section having first and second ends, and a central mast section connecting the second end of said first mast section to the first end of said second mast section;
   c) retainers positioned on said second mast section; and
   d) a tiltable rotor mounted on said mast at a location between said retainers, said rotor including a mast receiving bore that tapers outwardly from a circular edge toward said second mast section second end with a given diameter greater than said mast diameter to a continuous edge toward said second mast section first end, an extension of the longitudinal axis of said first mast section approximately intersects the location on said second mast section where said rotor is mounted.

9. The autogyro of claim 8, wherein said first, second and central mast sections are in a common plane.

10. The autogyro of claim 8, wherein said first, second and central mast sections are integrally formed of a bent rod having a circular cross-section.

11. The autogyro of claim 8, wherein said central mast section includes a first end attached to the second end of said first mast section, a second end attached to the first end of said second mast section, and extends toward said fuselage rear between its first and second ends.

12. The autogyro of claim 8, wherein said mast is rotatable in said mast mount.

13. A tethered autogyro comprised of:

a) a fuselage having a front, a rear and a mast mount;

b) a rotor mast with a circular cross-section of a given diameter extending from said fuselage mast mount, said mast including a generally vertical first mast section having a first end attached to said mast mount and a second end, a second mast section having first and second ends, and a central mast section connecting the second end of said first mast section to the first end of said second mast section;

c) retainers positioned on said second mast section, said retainers being separated by a given distance; and d) a tiltable rotor mounted on said mast between said retainers, said rotor including a hub having a vertical dimension, and rotor blades with parallel longitudinal axes extending outwardly from opposite sides of said hub, said hub including a mast receiving bore that tapers outwardly from a circular edge toward said second mast section second end with a given diameter approximately equal to said mast diameter to a continuous edge toward said second mast section first end having a diameter in the direction parallel to said blade longitudinal axes substantially greater than said mast diameter.

\* \* \* \* \*